B. GABLER.
AUTOMATIC CUP.
APPLICATION FILED APR. 9, 1910.

982,585.

Patented Jan. 24, 1911.

Witnesses
E. Larson
H. M. Brooks.

Inventor
B. Gabler
By Peeler & Robb
Attorney

UNITED STATES PATENT OFFICE.

BENJAMIN GABLER, OF HARBOR BEACH, MICHIGAN.

AUTOMATIC CUP.

982,585. Specification of Letters Patent. Patented Jan. 24, 1911.

Application filed April 9, 1910. Serial No. 554,429.

*To all whom it may concern:*

Be it known that I, BENJAMIN GABLER, a citizen of the United States, residing at Harbor Beach, in the county of Huron and State of Michigan, have invented certain new and useful Improvements in Automatic Cups, of which the following is a specification.

This invention relates to lubricators and primarily to oil or grease cups which automatically discharge the lubricant to the bearing to be lubricated.

The device has in view the provision of novel means to retain the cover of the device securely on the body or reservoir in such a manner as to prevent the same from being accidentally removed or jarred off, thus adapting the cup for use on movable parts of engines and the like.

A further object is to provide a cover to perform the function of a plunger also, to force the lubricant to the bearings.

Figure 1:
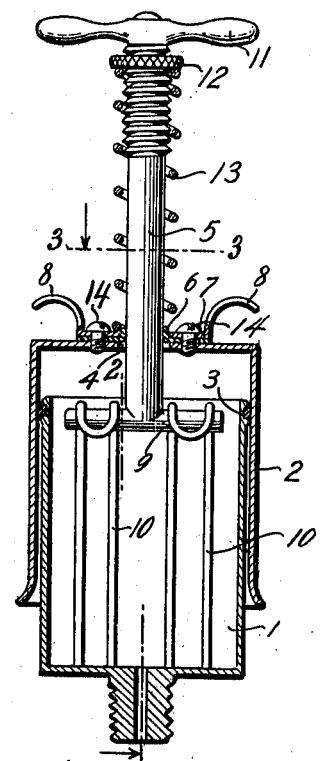
Figure 2:
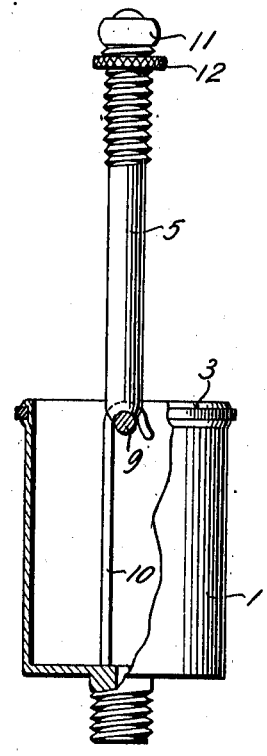
Figure 3:
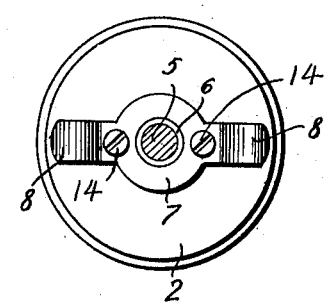

With the above and other objects in view reference is to be had to the following description, claims, and the accompanying drawing in which:

Figure 1 is a longitudinal section of the present invention parts thereof being in elevation; Fig. 2 is a similar view taken on line 2—2, of Fig. 1; Fig. 3 is a transverse section taken on line 3—3 of Fig. 1.

In the accompanying drawing, 1 indicates the body or reservoir having an outlet in its bottom as in the ordinary type of grease cups. The body 1 is provided with a groove 3 on the outside, adjacent the top, in which is seated any suitable packing to insure a grease tight joint between the body and the cover 2. The said top is, approximately, of the same depth as the body but is of greater diameter to permit the cover to slide down over the body 1 and force the lubricant out. The cover 2 is provided with an opening 4 in its top, through which extends the stem 5. Suitable packing is placed around the stem 5 comprising a gasket 6 which is clamped down to the cover 2 by a washer 7, said washer being secured by screws 14 to the cover. This washer is provided with oppositely and upwardly extending ears 8 forming finger pieces or grips. The stem 5 has on its lower extremity a cross piece 9 which is engaged by two vertically extending hooks 10 each hook comprising an inverted U-shaped section of wire, the arms thereof being secured to the bottom of the body 1, and adjacent the bend of said U-shaped member being bent upon themselves to form the hook portions adapted to engage the said cross piece. To the opposite extremity of stem 5 is fastened a handle 11. Adjacent the said extremity the stem is provided with external screw threads which carry an adjusting nut 12, said nut adjusting the tension of the pressure spring 13 intermediate the nut and the cover 2. The lower end of said spring 13 bears on the washer 7 and thereby holds the cross piece 9 in engagement with the hooks 10. By placing the palm of the hand on the handle 11 and catching the finger pieces 8 with the fingers an upward pull with the latter will lift the cover clear of the body 1, the stem 5 being of sufficient length to permit this. A slight downward and lateral movement of the stem 5 will release the cross piece 9 from the standards 10 and permit the cover to be removed. To put the cover on, the above operation is reversed.

What is claimed as new is:

1. In a grease cup, the combination with a reservoir, of a cover, a stem passing through said cover, retaining means in said reservoir detachably engaging said stem, and resilient means coacting with said stem for retaining said stem in engagement with said retaining means and forcing the cover closed.

2. In a grease cup, the combination with a reservoir, of a cover, a stem, retaining means in said reservoir to detachably engage said stem, and spring means carried by the stem exterior to the reservoir adapted to hold said stem and retaining means in detachable engagement and to keep the cover closed.

3. In a grease cup, the combination with a reservoir, of a cover, a stem, hooks carried by said reservoir to detachably engage said stem, and spring means carried by the stem to retain the same in engagement with the hooks and to force the cover closed.

4. In a grease cup, the combination with a reservoir, of a cover, a stem, hooks carried by the bottom of said reservoir to detachably engage said stem, and a spring having one extremity bearing on the cover and the opposite extremity on the stem tending to force the two apart and thus retain the stem in engagement with the hooks.

In testimony whereof I affix my signature in presence of two witnesses.

BENJAMIN GABLER.

Witnesses:
J. L. BRENNAN,
W. J. ENGLE.